US006222956B1

(12) United States Patent
Akiba et al.

(10) Patent No.: US 6,222,956 B1
(45) Date of Patent: Apr. 24, 2001

(54) OPTICAL WAVELENGTH MULTIPLEXER/DEMULTIPLEXER

(75) Inventors: Kenji Akiba, Fukushima; Kimio Inaba; Kenichi Morosawa, both of Ibaraki, all of (JP)

(73) Assignee: Hitachi Cable Ltd., Tokyo (JP)

( * ) Notice: Subject to any disclaimer, the term of this patent is extended or adjusted under 35 U.S.C. 154(b) by 0 days.

(21) Appl. No.: 09/190,170

(22) Filed: Nov. 12, 1998

(30) Foreign Application Priority Data

May 29, 1998 (JP) .................................................. 10-150365
Jun. 3, 1998 (JP) .................................................. 10-155003

(51) Int. Cl.[7] .................................................. G02B 6/26
(52) U.S. Cl. .................................. 385/24; 385/46; 385/39
(58) Field of Search ............................... 385/24, 37, 43, 385/46, 48, 36, 50, 51

(56) References Cited

U.S. PATENT DOCUMENTS

| 5,243,672 | * | 9/1993 | Dragone | 385/46 |
| 5,412,744 | | 5/1995 | Dragone . | |
| 5,515,460 | * | 5/1996 | Stone | 385/24 |
| 5,982,960 | * | 11/1999 | Akiba et al. | 385/24 |
| 6,014,482 | * | 1/2000 | Laude | 385/31 |
| 6,049,644 | * | 4/2000 | Dragone | 385/37 |
| 6,069,990 | * | 5/2000 | Okawa et al. | 385/43 |

FOREIGN PATENT DOCUMENTS

| 4-116607 | 4/1992 | (JP) . |
| 4-163406 | 6/1992 | (JP) . |
| 4-220602 | 8/1992 | (JP) . |
| 4-326308 | 11/1992 | (JP) . |
| 5-157920 | 6/1993 | (JP) . |
| 7-333447 | 12/1995 | (JP) . |

OTHER PUBLICATIONS

Flat Channel–Passband–Wavelength Multiplexing and Demultiplexing Devices by Multiple–Rowland–Circle Design Y.P. Ho, H. Li, and Y. J. Chen—Mar. 3, 1997 vol. 9 No. 3.

* cited by examiner

Primary Examiner—Frank G. Font
(74) Attorney, Agent, or Firm—McDermott, Will & Emery

(57) ABSTRACT

Plurality of channel waveguides of an arrayed waveguide diffraction grating are arranged such that all of intervals thereof are not constant between each two adjacent channel waveguides at a first coupling portion for coupling an input slub waveguide and the arrayed waveguide diffraction grating and a second coupling portion for coupling an output slub waveguide and the arrayed waveguide diffraction grating. Further, the plurality of channel waveguides of the arrayed waveguide diffraction grating are arranged such that all of length differences thereof are not constant between each two adjacent channel waveguides. For example, one of the channel waveguides is deleted, so that a length difference of adjacent channel waveguides is determined to be larger than that of the other two adjacent waveguides. According to this structure, it is possible to provide an optical waveguide multiplexer/demultiplexer in which an insertion loss property becomes flat in all wavelength ranges and the insertion loss characteristics are not fluctuated by the fluctuation of the wavelength.

11 Claims, 9 Drawing Sheets

OPTICAL WAVELENGTH MULTIPLEXER/DEMULTIPLEXER

FIELD OF THE INVENTION

The invention relates to an optical wavelength multiplexer/demultiplexer, and more particularly to an optical wavelength multiplexer/demultiplexer, in which the fluctuation of an optical insertion loss caused by the fluctuation of wavelengths can be decreased.

BACKGROUND OF THE INVENTION

In recent years, as a communication system providing an information service with high speed and large capacity, a WDM (Wavelength Division Multiplexing) optical communication system has been developed. In particular, an optical communication system using an arrayed waveguide diffraction grating as an optical wavelength multiplexer/demultiplexer, in which plural optical signals with different wavelengths can be multiplexed or demultiplexed, is greatly expected. For example, this type of optical communication systems using an arrayed waveguide diffraction grating are disclosed in Japanese Patent Application Laid-Open Nos. 4-116607, 4-163406, 4-220602, 4-326308, 5-157920, etc.

In the conventional arrayed waveguide diffraction grating type optical wavelength multiplexer/demultiplexer, when a pass band characteristic is flattened, the fluctuation of an optical insertion loss caused by the wavelength fluctuation of a light source is relatively small, so that optical signals can be multiplexed and/or demultiplexed in a static state. Accordingly, the arrayed waveguide diffraction grating type optical wavelength multiplexer/demultiplexer is especially expected as an effective device for the optical WDM communication. This advantageous feature of the optical wavelength multiplexer/demultiplexer is described, for example, in U.S. Pat. No. 5,412,744.

As a structure of an optical wavelength multiplexer/demultiplexer using an arrayed waveguide diffraction grating, a structure comprising an input waveguide and output waveguides which are coupled to both ends of an arrayed waveguide diffraction grating via an input slub waveguide and an output slab waveguide, respectively, has been known.

FIG. 1 shows a structure of a conventional optical wavelength multiplexer/demultiplexer of this type, wherein the optical wavelength multiplexer/demultiplexer comprises a substrate 1, an input waveguide 2 formed on one side of the substrate 1, output waveguides 3 formed on another side of the substrate 1, and an arrayed waveguide diffraction grating 4 formed on a central portion of the substrate 1, wherein the arrayed waveguide diffraction grating 4 is composed of a plurality of channel waveguides 5 in parallel having predetermined path lengths.

The optical wavelength multiplexer/demultiplexer further comprises an input slub waveguide 6 for coupling the input waveguide 2 and the arrayed waveguide diffraction grating 4, an output slub waveguide 7 for coupling the output waveguides 3 and the arrayed waveguide diffraction grating 4, and a mode conversion portion 8 provided between the input waveguide 2 and the input slab waveguide 6 for flattening the optical loss-wavelength characteristics.

For example, in this conventional optical wavelength multiplexer/demultiplexer, for demultiplexing multiplexed optical signals, multiplexed optical signals $\lambda_1$ to $\lambda_9$ each having different wavelengths, wherein $\lambda_1$ to $\lambda_9$ indicate different wavelengths and the relation $\lambda_1<\lambda_2<---<\lambda_8<\lambda_9$ is set, are input from the input waveguide 2 and transmitted through the mode conversion portion 8, then radiated into the input slab waveguide 6. Next, the multiplexed optical signals $\lambda_1$ to $\lambda_9$ are divided at an input end 9 of the arrayed waveguide diffraction grating 4, then transmitted through the channel waveguides 5 and an output end 10 of the arrayed waveguide diffraction grating 4, and focused at a focusing plane 11 of the output slab waveguide 7. Thus, the multiplexed optical signals $\lambda_1$ to $\lambda_9$ are demultiplexed and output from the output waveguides 3 having nine ends as demultiplexed optical signals $\lambda_1, \lambda_2 --- \lambda_9$, respectively.

According to the conventional optical waveguide multiplexer/demultiplexer, however, the optical characteristics required for practical use cannot be obtained sufficiently. For example, when the optical characteristics of the device is influenced by the stigmatism of the output slub waveguides, etc., the flatness of the optical insertion loss in the pass band becomes insufficient. Accordingly, if the wavelength shows a slight fluctuation, the optical insertion loss characteristic of the waveguide will be greatly fluctuated.

Next, thisphenomenon will be explained referring to FIGS. 2A, 2B, and 2C to 5.

FIGS. 2A to 2C show electric field distributions at the mode conversion portion 8 in the direction A–A', the input end 9 of the arrayed waveguide diffraction grating 4 in the direction B–B', and the output end 10 in the direction C–C', respectively. At the mode conversion portion 8, an electric field distribution 13' has a twin-peaks-shape profile. At the input end 9, because of the diffraction effect, an electric field distribution 14, has a maximum peak L' and minimum peaks $m_1$' and $m_2$'. At the output end 10, an electric field distribution 15' reprises a profile of the electric field distribution 14' at the input end 9.

FIGS. 3A to 3C show phase distributions of the optical signals $\lambda_1, \lambda_5$, and $\lambda_9$ at the output end 10 of the arrayed waveguide diffraction grating 4, respectively. A phase distribution 17' of the optical signal $\lambda_5$ shows a symmetric phase profile as shown in FIG. 3B. On the other hand, a phase distribution 16' of the optical signal $\lambda_1$ and a phase distribution 18' of the optical signal $\lambda_9$ show asymmetric phase profiles as shown in FIGS. 3A and 3C, respectively.

It is because that the optical wavelength multiplexer/demultiplexer is designed based on a propagation constant of an intermediate wavelength $\lambda_5$. Namely, comparing with the phase profile of the optical signal $\lambda_5$, the phase profiles of the optical signals $\lambda_1$ and $\lambda_9$ are inclined to the arrayed waveguide diffraction grating 4 in accordance with the respective propagation constants thereof.

Accordingly, a phase profile 19' of FIG. 3D, which is a phase difference between the phase distributions 16' and 17' shown in FIGS. 3A and 3B, shows a continued inclination in the right upper direction. On the other hand, a phase profile 21' of FIG. 3E, which is a phase difference between the phase distributions 17' and 18' shown in FIGS. 3B and 3C, shows a continued inclination in the left upper direction which is opposite to that of FIG. 3D.

A length difference $\Delta_L$ between two adjacent channel waveguides 5 based on the propagation constant of the intermediate wavelength $\lambda_5$ is determined by a following formula (1):

$$\Delta_L = 2 \cdot m \cdot \pi / \beta(\lambda_5) \tag{1}$$

wherein, m is a diffraction order number (a positive integer) and $\beta(\lambda_5)$ is a propagation constant of the channel waveguides for the optical signal $\lambda_5$.

FIG. 4 shows an electric field distribution at the focusing plane 11 in the direction D–D'.

As shown in FIG. 4, an electric field distribution 24' at a position $x_5$ corresponding to the optical signal $\lambda_5$ has a symmetric twin-peaks-shape profile, similarly to the electric field distribution at the mode conversion portion 8. On the other hand, an electric field distribution 23' of the optical signals $\lambda_1$ at a terminal position $x_1$ and an electric field distribution of the optical signal $\lambda_9$ at a terminal position $x_9$ have asymmetric profiles, respectively, because of the stigmatism of the output slab waveguide 7.

The optical insertion loss of the output waveguides 3 are determined by a multiplexed integral of an electric field distribution of optical signals at the focusing plane 11 and an inherent mode of the output waveguides 3. However, it is evidently undesirable that the electric field distribution becomes more asymmetric in accordance with the increase of the distance from the central position $x_5$ as described above.

FIG. 5 shows an optical loss to wavelength characteristics, namely a relationship between an optical loss and respective wavelengths of demultiplexed optical signals $\lambda_1$ to $\lambda_9$. As shown in FIG. 5, since a pass band corresponding to the central position $x_5$ has a flat characteristic shown as a profile 27', even if the wavelength $\lambda_5$ is slightly fluctuated, the fluctuation of the optical insertion loss is not caused. On the other hand, the pass bands corresponding to the positions $x_1$ and $x_9$, where the electric field distributions thereof are asymmetric, have inclined characteristics shown as profiles 26' and 28', respectively. As a result, the optical insertion loss thereat is fluctuated when the wavelength of the optical signals is slightly fluctuated at the light source.

SUMMARY OF THE INVENTION

Accordingly, it is an object of the invention to provide an optical wavelength multiplexer/demultiplexer, in which an insertion loss characteristic becomes flat in all of the wavelength ranges and the optical insertion loss is not fluctuated even if the wavelength is fluctuated.

According to the first feature of the invention, an optical wavelength multiplexer/demultiplexer, comprises:

an input waveguide formed on a substrate;

output waveguides formed on the substrate;

an arrayed waveguide diffraction grating comprising a plurality of channel waveguides in parallel formed to have predetermined length differences between two adjacent channel waveguides on the substrate;

an input slub waveguide for coupling the input waveguide to the arrayed waveguide diffraction grating to provide a first coupling portion; and an output slab waveguide for coupling the arrayed waveguide diffraction grating to the output waveguide to provide a second coupling portion;

wherein the plurality of channel waveguides of the arrayed waveguide diffraction grating are arranged such that all of intervals thereof are not constant between each two adjacent channel waveguides at the second coupling portion.

According to the second feature of the invention, an optical wavelength multiplexer/demultiplexer, comprises:

an input waveguide formed on a substrate;

output waveguides formed on the substrate;

an arrayed waveguide diffraction grating comprising a plurality of channel waveguides in parallel formed to have predetermined length differences between two adjacent channel waveguides on the substrate;

an input slab waveguide for coupling the input waveguide to the arrayed waveguide diffraction grating to provide a first coupling portion; and an output slab waveguide for coupling the arrayed waveguide diffraction grating to the output waveguide to provide a second coupling portion;

wherein the plurality of channel waveguides of the arrayed waveguide diffraction grating are arranged such that all of intervals thereof are not constant between each two adjacent channel waveguides at the first and second coupling portions.

As means for determining all of intervals of the plurality of channel waveguides such that they are not constant between each two adjacent channel waveguides at the first and second coupling portions, it is appropriate to use an adjustment of the intervals by angle.

According to the third feature of the invention, an optical wavelength multiplexer/demultiplexer, comprises:

an input waveguide formed on a substrate;

output waveguides formed on the substrate;

an arrayed waveguide diffraction grating comprising a plurality of channel waveguides in parallel formed to have predetermined length differences between two adjacent channel waveguides on the substrate;

an input slub waveguide for coupling the input waveguide to the arrayed waveguide diffraction grating to provide a first coupling portion; and an output slub waveguide for coupling the arrayed waveguide diffraction grating to the output waveguide to provide a second coupling portion;

wherein the plurality of channel waveguides of the arrayed waveguide diffraction grating are arranged such that all of length differences thereof are not constant between each two adjacent channel waveguides.

BRIEF DESCRIPTION OF THE DRAWINGS

The invention will be explained in more detail in conjunction with appended drawings, wherein:

FIG. 5 is a graph showing optical insertion loss characteristics of the conventional optical wavelength multiplexer/demultiplexer shown in FIG. 1, FIGS. 6A and 6B are explanatory diagrams showing an optical wavelength multiplexer/demultiplexer in a first preferred embodiment according to the invention, wherein FIG. 10 is a graph showing a graph showing optical insertion loss characteristics of an optical wavelength multiplexer/demultiplexer in the first preferred embodiment shown in FIGS. 6A and 6B, and FIGS. 11A and 11B are explanatory diagrams showing an optical wavelength multiplexer/demultiplexer in a second preferred embodiment according to the invention, wherein

DESCRIPTION OF THE PREFERRED EMBODIMENTS

Next, an optical wavelength multiplexer/demultiplexer in the preferred embodiments according to the invention will be explained in more detail in conjunction with the appended drawings.

Figure 1:
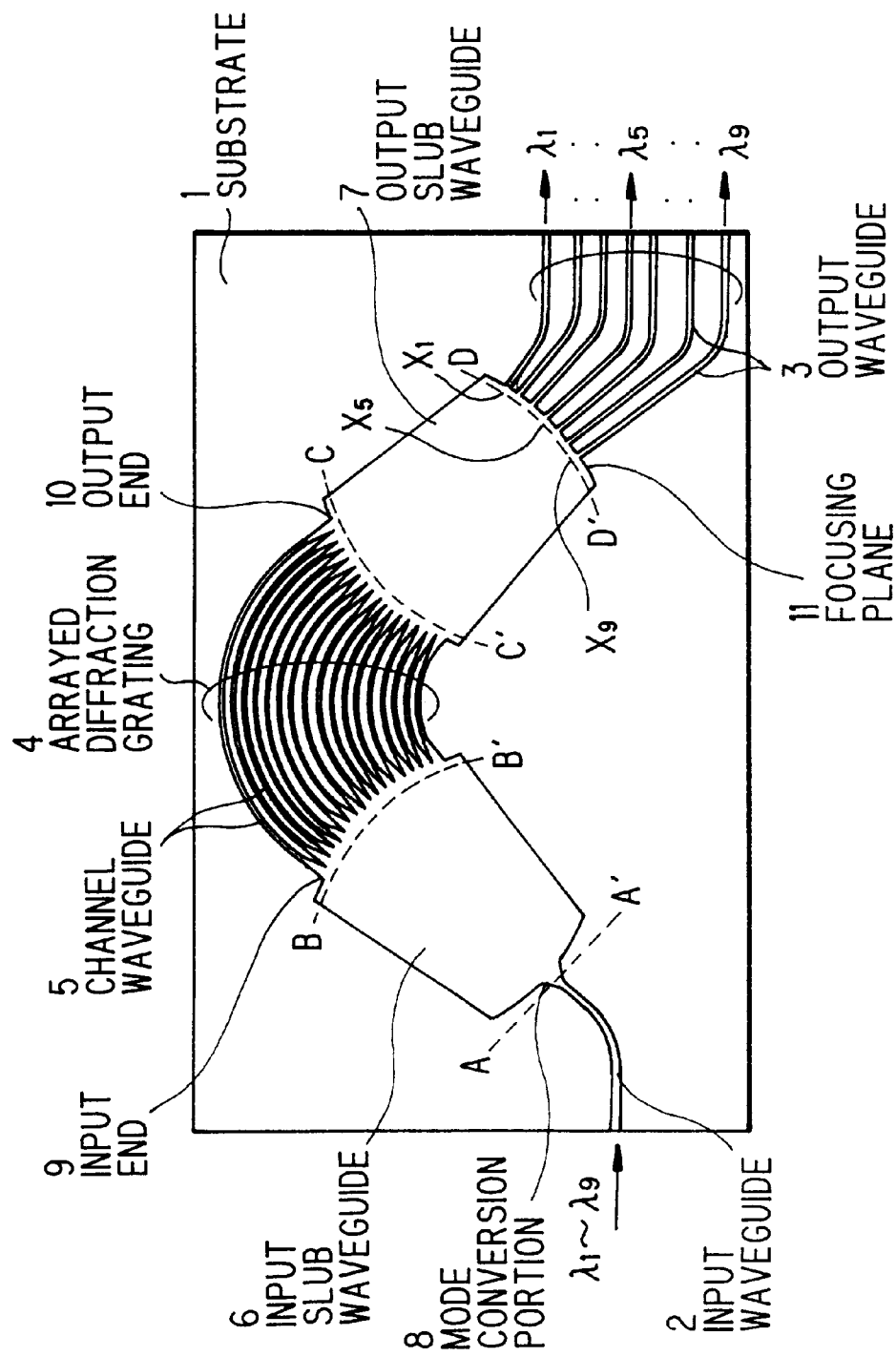
FIG. 1 is an explanatory diagram showing a conventional optical wavelength multiplexer/demultiplexer.
Figure 2A:
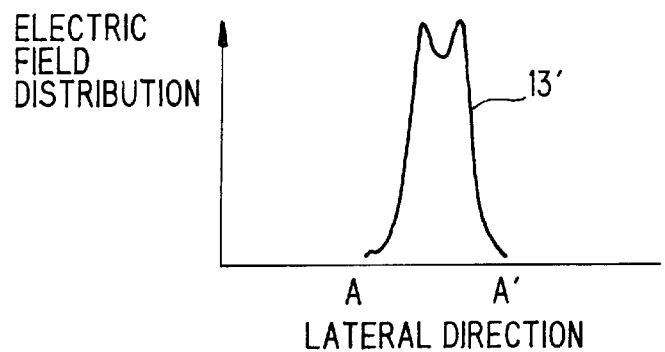
FIGS. 2A to 2C are graphs showing electric field distributions of optical signals at a mode conversion portion of the conventional optical wavelength multiplexer/ demultiplexer shown in FIG. 1, FIGS. 3A to 3E are graphs showing phase distributions and phase differences of optical signals at an output end of the conventional optical wavelength multiplexer/ demultiplexer shown in FIG. 1.
Figure 2B:
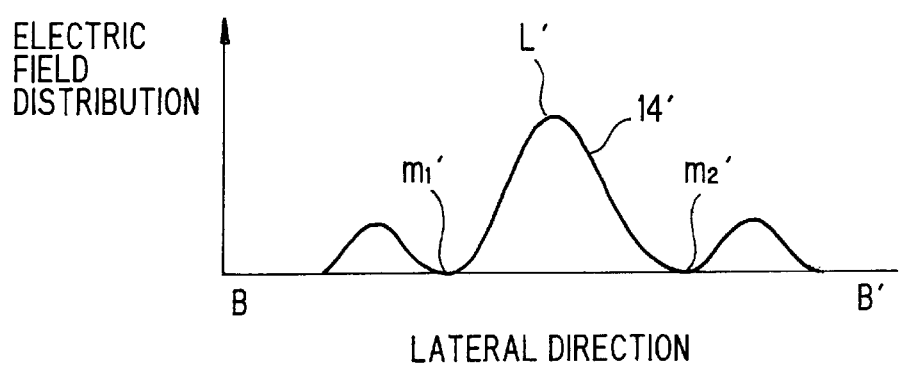
Figure 2C:
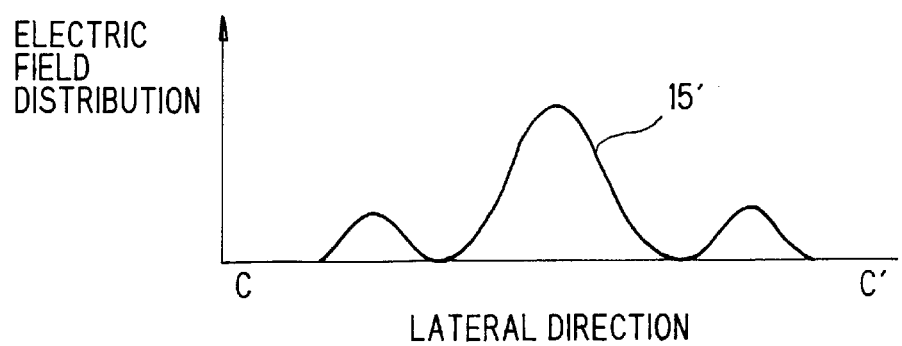
Figure 3A:
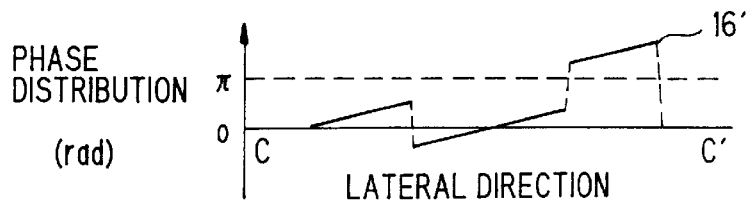
Figure 3B:
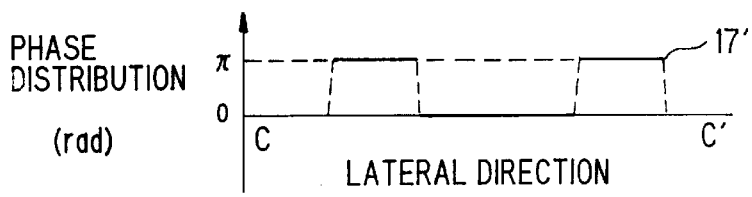
Figure 3C:
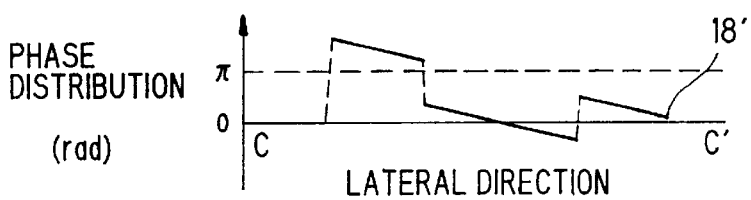
Figure 3D:
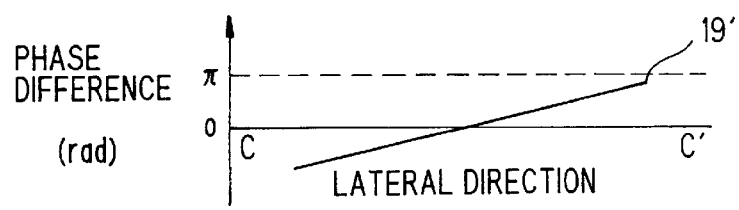
Figure 3E:
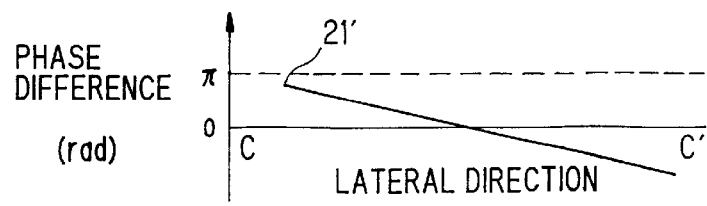
Figure 4:
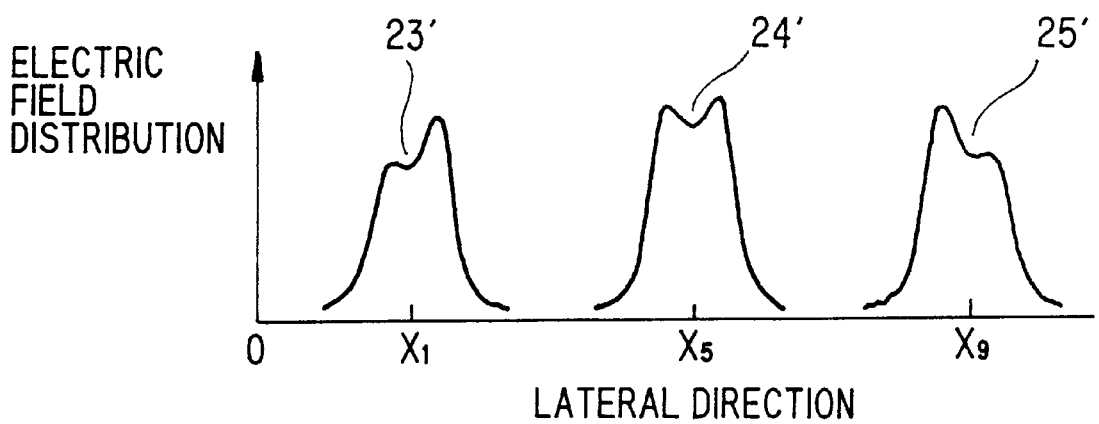
FIG. 4 is a graph showing an electric field distribution of optical signals at a focusing plane of the conventional optical wavelength multiplexer/demultiplexer shown in FIG. 1.
Figure 5:
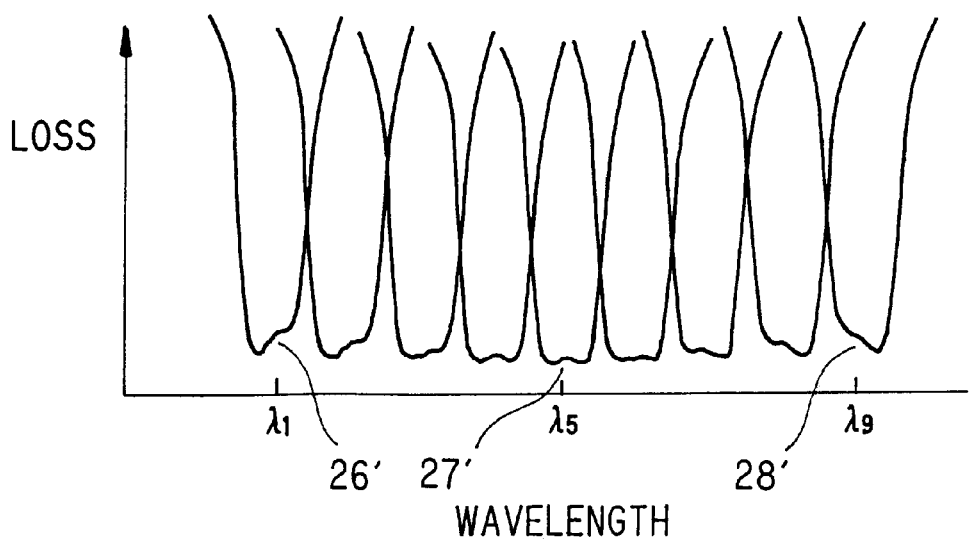
Figure 6A:
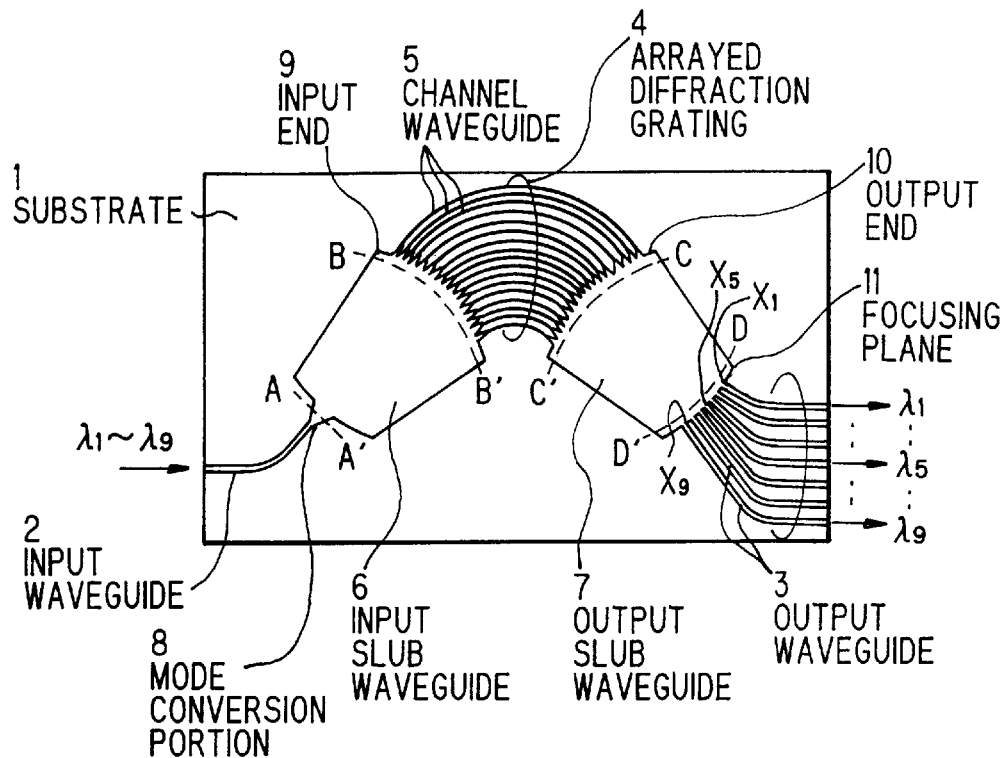
FIG. 6A is a plan view thereof and FIG. 6B is a partial enlarged view thereof.
Figure 6B:
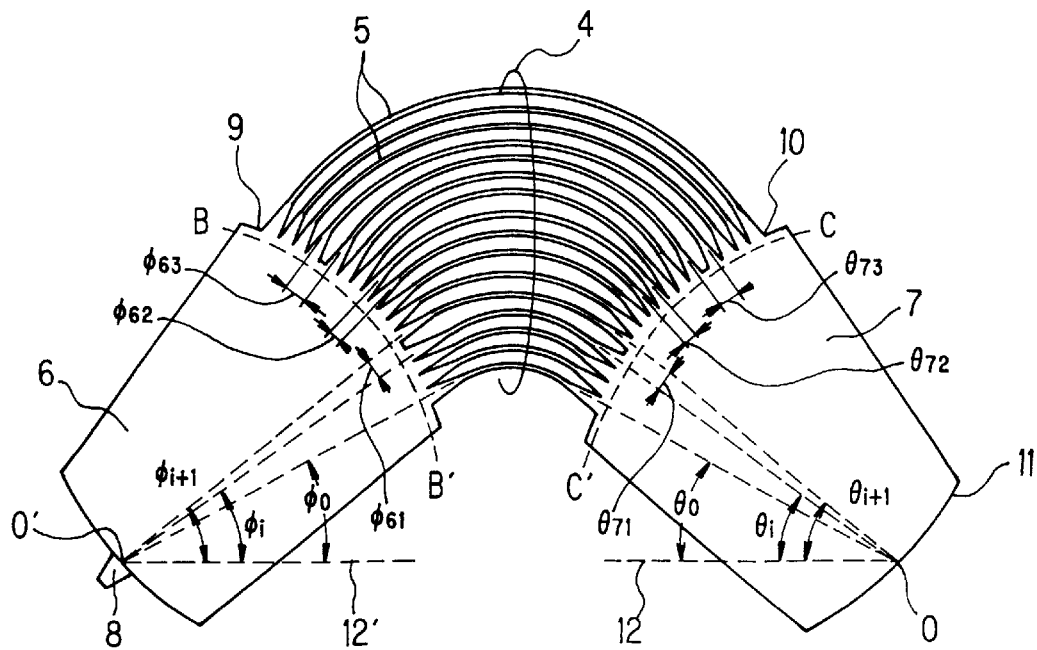

FIGS. 6A and 6B show an optical wavelength multiplexer/demultiplexer in a first preferred embodiment according to the invention, wherein the optical wavelength multiplexer/demultiplexer comprises a substrate 1, an input waveguide 2 formed on one side of the substrate 1, output waveguides 3 formed on another side of the substrate 1, and an arrayed waveguide diffraction grating 4 comprising a plurality of channel waveguides 5 formed on a central portion of the substrate 1, wherein the arrayed waveguide diffraction grating 1 is composed of a plurality of channel waveguides 5 in parallel each having predetermined path length difference.

The optical wavelength multiplexer/demultiplexer further comprises an input slab waveguide 6 inserted between the input waveguide 2 and the arrayed waveguide diffraction grating 4, an output slub waveguide 7 inserted between the output waveguide 3 and the arrayed waveguide diffraction grating 4, and a mode conversion portion 8 provided between the input waveguide 2 and the input slab waveguide 6, wherein an input end 9 the arrayed waveguide diffraction grating 4 transmits optical signals to the arrayed waveguide diffraction grating 4, and an output end 10 of the arrayed waveguide diffraction grating 4 focuses the optical signals on a focusing plane 11 formed at an end portion of the output slub waveguide 7.

In the optical wavelength multiplexer/demultiplexer, nine-wavelength multiplexed optical signals each having wavelengths $\lambda_1$ to $\lambda_9$ are input from the input waveguide 2 and transmitted through the input slab waveguide 6, the arrayed waveguide diffraction grating 4 and the output slab waveguide 7. The multiplexed optical signals $\lambda_1$ to $\lambda_9$ are demultiplexed therethrough and finally output from the output waveguides 3 as demultiplexed optical signals $\lambda_1$, $\lambda_2$ - - - $\lambda_9$, respectively.

According to the optical waveguide multiplexer/demultiplexer in the first preferred embodiment, the plurality of channel waveguides 5 in parallel are provided with predetermined intervals as described below such that all intervals thereof are not constant between each two adjacent channel waveguides, at the both of a first coupling portion (namely, at the input end 9) for coupling the input slab waveguide 6 and the arrayed waveguide diffraction grating 4 and a second coupling portion (namely, at the output end 10) for coupling the output slab waveguide 7 and the arrayed waveguide diffraction grating 4.

The intervals of the channel waveguides 5 are determined as explained below.

First, a process for determining an interval of the channel waveguides 5 at the second coupling portion for coupling the output slub waveguide 7 and the arrayed waveguide diffraction 4 is explained as an example. Herein, it is assumed that the total number of the channel waveguides 5 is N, and a number in numerical order of one of the channel waveguides 5 is i. When the plurality of the channel waveguides 5 are divided into first to third groups in accordance with the positioning order, the smallest number in numerical order of the channel waveguides 5 classified into the second group is $i_1$, the smallest number in numerical order of the channels waveguides 5 classified into the third group is $i_2$, an angle formed by one of the channel waveguides 5 having the number i=1 to reference line 12 at a reference point 0 of the output slub waveguide 7 is $\theta_0$, a common angle for determining intervals of the channel waveguides 5 is $\Delta\theta$, and first and second correction angles determined in accordance with the first and second groups of the channel waveguides 5 are $\Delta\theta_1$ and $\Delta\theta_2$, respectively. The angle $\theta_i$ for determining an interval of the i-th channel waveguide is determined in accordance with following formula (2):

$$\theta_i = \theta_0 + \Delta\theta \times (i-1) \qquad (1 \leq i < i_1) \qquad (2)$$
$$= \theta_0 + \Delta\theta \times (i-1) + \Delta\theta_1 \qquad (i_1 \leq i < i_2)$$
$$= \theta_0 + \Delta\theta \times (i-1) + \Delta\theta_1 + \Delta\theta_2 \quad (i_2 \leq i \leq N).$$

In this case, it is preferable that the first correction angle $\Delta\theta_1$ is provided within a range determined by a formula (3):

$$-0.5 \times \Delta\theta \leq \Delta\theta_1 \leq 0.5 \times \Delta\theta \qquad (3)$$

Further, it is also preferable that the second correction angle $\Delta\theta_2$ is provided within a range determined by a formula (4):

$$-0.5 \times \Delta\theta \leq \Delta\theta_2 \leq 0.5 \times \Delta\theta \qquad (3)$$

When the total number of the channel waveguides 5 is N, and the numbers $i_1$, $i_2$ in numerical order of the channel waveguides 5 are defined as follows:

$$i_1 = dN_1$$
$$i_2 = N - dN_2 \qquad (5)$$

wherein $N > dN_1$, $dN_2$, it is preferable that $dN_1$ and $dN_2$ are provided in the range of ⅙ to ⅓ of the total number N of the channel waveguides 5.

It is not preferable that the $dN_1$ and $dN_2$ are provided beyond this range, since the stigmatism canceling effect is not obtained sufficiently at the lower limit thereof and this effect becomes excessive at the upper limit thereof.

FIG. 6B shows intervals $\theta_{71}$ to $\theta_{73}$ of the channel waveguides 5 at the output end 10, which are provided in accordance with the formula (2), respectively:

$$\theta_{71} = \Delta\theta + \Delta\theta_1$$
$$\theta_{72} = \Delta\theta$$
$$\theta_{73} = \Delta\theta + \Delta\theta_2$$

Intervals $\phi_{61}$, $\phi_{62}$, and $\phi_{63}$ of the channel waveguides 5 at the first coupling portion for coupling the input slub waveguide 6 and the arrayed waveguide diffraction grating 4 shown in FIGS. 6A and 6B are determined similarly to the above process.

In this case, the formulas (2) to (5) and the descriptions relating thereto are applied to the intervals $\phi_{61}$ to $\phi_{63}$ by replacing $\theta$ with $\phi$.

The intervals $\phi_{61}$, $\phi_{62}$, and $\phi_{63}$ of the channel waveguides 5 at the input end 9 are provided in accordance with the formula (2), respectively:

$$\phi_{61} = \Delta\phi + \Delta\phi_1$$

$$\phi_{62} = \Delta\phi$$

$$\phi_{63} = \Delta\phi + \Delta\phi_2$$

Herein, the value of $\phi_{61}$ at the input end 9 may be different from the value of $\theta_{71}$ at the output end 10, and it is similar to the other intervals $\phi_{63}$ and $\phi_{73}$.

In the first preferred embodiment, the plurality of channel waveguides 5 are classified into plural groups on the side of the output slab waveguide 7 in the same manner as on the side of the input slab waveguide 6. However, the manners of classification of the channel waveguides 5 on respective sides may be different from each other. Namely, it is not necessary to coincide a position for inserting the correction angle of the output slab waveguide side with that of the input slub waveguide side.

Next, functions of an optical wavelength multiplexer/demultiplexer in the first preferred embodiment according to the invention will be explained.

In the first preferred embodiment, a waveguide length difference $\Delta_L$ of each two adjacent channel waveguides of the channel waveguides 5, which composes the arrayed waveguide diffraction grating 4, is arranged based on the formula (1).

The total number N of the channel waveguides 5 in the formula (1) is 60, the first and second predetermined numbers $i_1$ and $i_2$ in numerical order of the channel waveguides 5 are 15th and 46th, respectively, the common angles are determined as 0.2(deg), and the correction angles $\Delta\theta_1$ and $\Delta\theta_2$, and $\Delta\phi_1$ and $\Delta\phi_2$ are determined as 0.02(deg) which are 1/10 of the common angles $\Delta\theta$ and $\Delta\phi$.

Figure 7A:
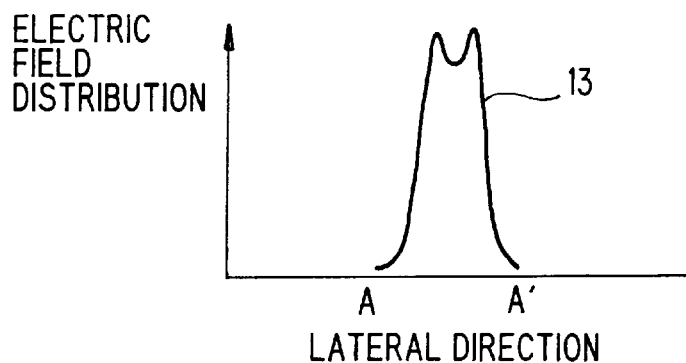
FIGS. 7A to 7C are graphs showing electric field distributions of optical signals at respective positions of an optical wavelength multiplexer/demultiplexer in the first preferred embodiment shown in FIGS. 6A and 6B, FIGS. 8A to 8E are graphs showing phase distributions and phase differences of optical signals at an output end of an optical wavelength multiplexer/demultiplexer in the first preferred embodiment shown in FIGS. 6A and 6B.
Figure 7B:
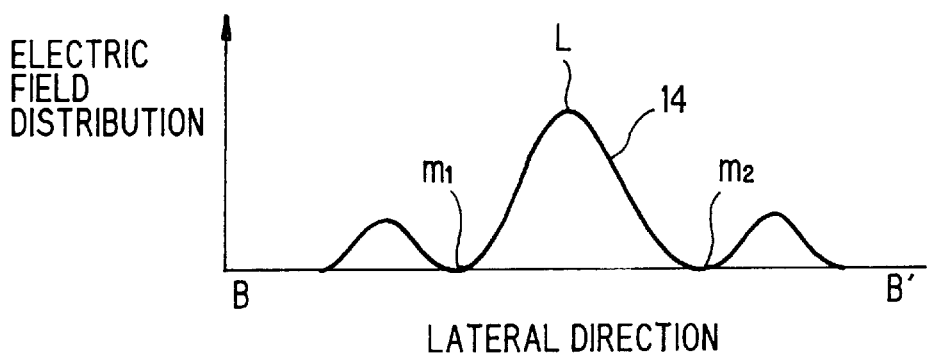
Figure 7C:
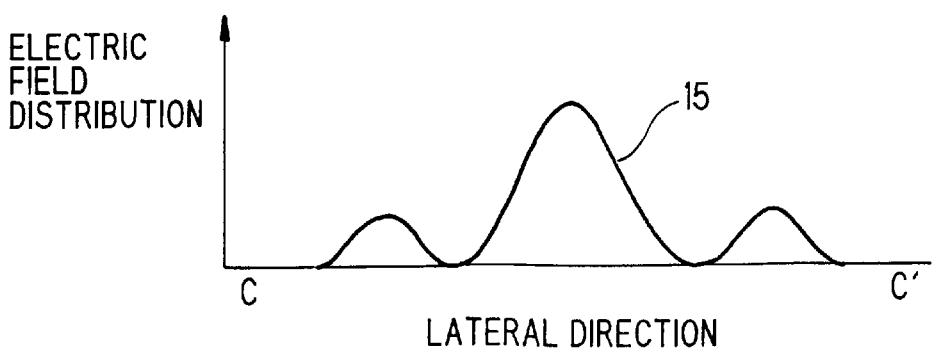

FIGS. 7A to 7C show electric field distributions of one of the optical signals $\lambda_1$ to $\lambda_9$ at following positions. The electric field distributions of the optical signals $\lambda_1$ to $\lambda_9$ show almost similar profiles.

Herein, FIG. 7A shows an electric field distribution at the mode conversion portion 8 in the direction A–A', FIG. 7B shows an electric field distribution at the input end 9 of the arrayed waveguide diffraction grating 4 in the direction B–B', and FIG. 7C shows an electric field distribution at the output end 10 in the direction C–C'.

An electric field distribution 13 shown in FIG. 7A has a twin-peaks-shape profile, an electric field distribution 14 shown in FIG. 7B has a maximum peak L and minimum peaks $m_1$ and $m_2$, because of the diffraction effect caused by the arrayed waveguide diffraction grating 4, an electric field distribution 15 shown in FIG. 7C reprises a profile of the electric field distribution 14.

The 15th and 46th channel waveguides are positioned corresponding to the minimum values $m_1$ and $m_2$, respectively. Namely, the correction angles are inserted into the positions corresponding to the minimum values of the electric field distribution.

Figure 8A:
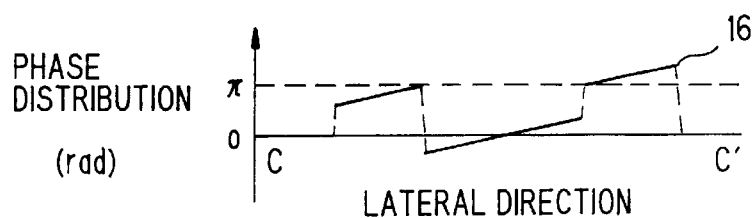
Figure 8B:
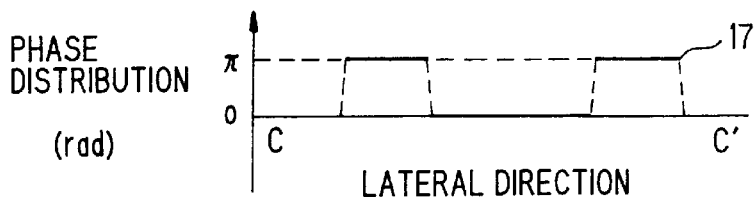
Figure 8C:
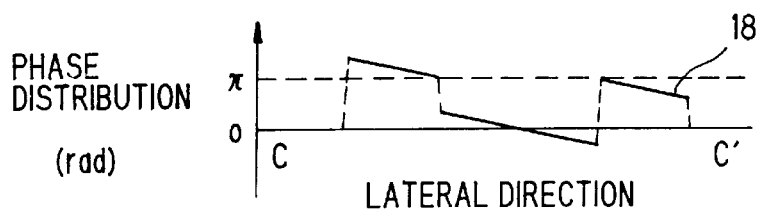

FIGS. 8A to 8E show phase distributions of optical signals at the output end 10 of the arrayed waveguide diffraction grating 4 in the direction C–C', wherein FIG. 8A shows a phase distribution of an optical signal $\lambda_1$, FIG. 8B shows a phase distribution of an optical signal $\lambda_5$, and FIG. 8C shows a phase distribution of an optical signal $\lambda_9$. In FIG. 8B, which shows the phase distribution of the optical signal $\lambda_5$ at a central position, a phase profile 17 is symmetric. On the other hand, in FIGS. 8A and 8C which show the phase distributions of the optical signals $\lambda_1$ and $\lambda_9$, since the propagation constant has a wavelength dependency, phase profiles 16 and 18 are inclined to the output end 10 of the arrayed waveguide diffraction grating 4 in accordance with the respective wavelengths.

Figure 8D:
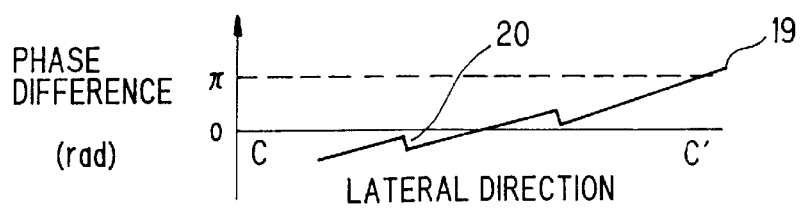
Figure 8E:
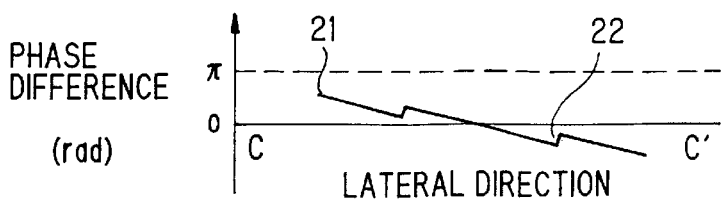

Further, FIGS. 8D and 8E show a phase difference 19 between the optical signal $\lambda_1$ shown in FIG. 8A and the optical signal $\lambda_5$ shown in FIG. 8B, and a phase difference 21 between the optical signal $\lambda_5$ shown in FIG. 8B and the optical signal $\lambda_9$ shown in FIG. 8C, respectively. The inclination of the profiles is not continued all over the channel waveguides 5 in the direction C–C', there are two discontinued parts 20 and 22 at intermediate (corresponding to the 15th and 46th channel waveguides) positions.

These discontinued parts 20 and 22 are formed by the correction angles $\Delta\theta_1$ and $\Delta\theta_2$ in the formula (2) for determining respective mutual angles of the channel waveguides 5 of the arrayed waveguide diffraction angle 4, which brings the effect of canceling stigmatism of the output slub waveguide 7, etc.

A discontinued amount $\delta\psi(\lambda_j)$ of the discontinued parts can be obtained as follows:

$$\delta\psi(\lambda_j) = [\beta(\lambda_j) - \beta(\lambda_5)] \cdot \Delta L \cdot \Delta\theta_1 / \Delta\theta \text{ or,}$$

$$= [\beta(\lambda_i) - \beta(\lambda_5)] \cdot \Delta L \cdot \Delta\phi_1 / \Delta\phi$$

wherein a propagation constant of respective optical signals is $\beta(\lambda_j)$. It is confirmed that the discontinued amount $\delta\psi(\lambda_j)$ becomes greater when a difference between the wavelength $\lambda_5$ and the wavelength of the respective optical signals becomes greater, and that the effect of correcting the stigmatism is increased in relative to the increase of the discontinued amount. Further this discontinued amount becomes greater when the percentage of the correction angles $\Delta\theta_1$ and $\Delta\phi_1$ to the common angles $\Delta\theta$ and $\Delta\theta\phi$ becomes greater.

Figure 9:
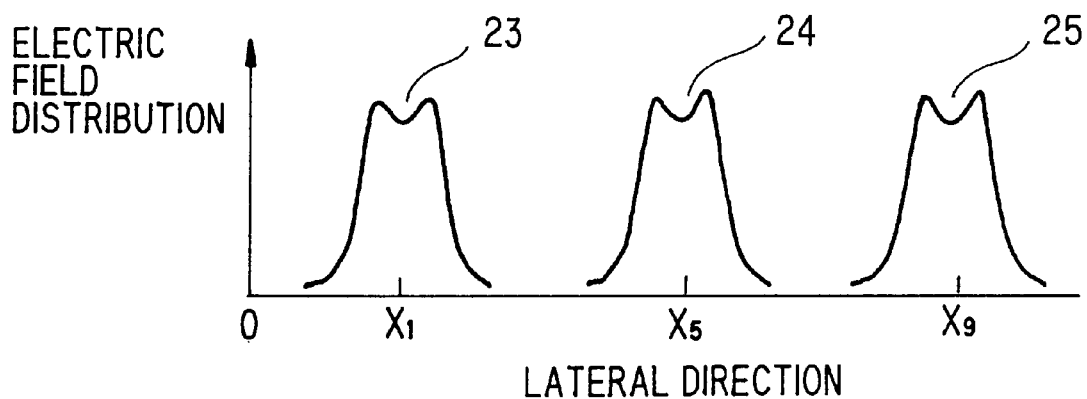
FIG. 9 is a graph showing an electric field distribution of optical signals at a focusing plane of an optical wavelength multiplexer/demultiplexer in the first preferred embodiment shown in FIGS. 6A and 6B.

FIG. 9 shows electric field distributions at positions $x_1$, $x_5$, and $x_9$ (corresponding to the optical signals $\lambda_1$, $\lambda_5$, and $\lambda_9$) of the focusing plane 11 in the direction D–D'.

As shown in FIG. 9, respective electric field distributions 23, 24, and 25 reprise the electric field distributions at the mode conversion portion 8 and have symmetric profiles. It is brought by the stigmatism canceling effect of the discontinued parts 20 and 22.

Although the electric field distributions 23, 24, and 25 are displaced on the focusing plane 11 in accordance with the respective wavelengths, the electric field distributions are kept to have symmetric twin-peaks-shape profiles. Accordingly, even if the wavelength of the optical signal is fluctuated, the optical insertion loss is not fluctuated so much.

Figure 10:
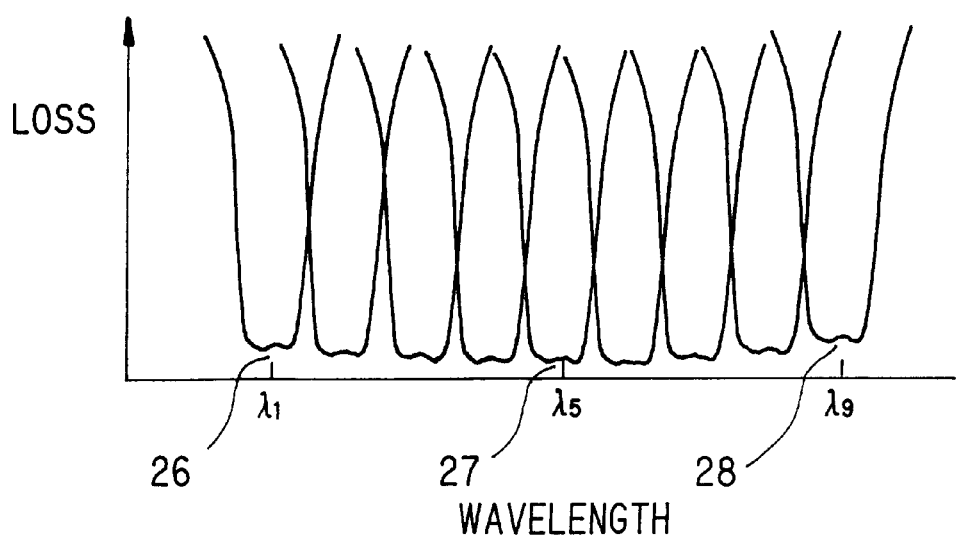

FIG. 10 shows the optical loss-wavelength characteristic, namely the relationship between the optical loss and the wavelength. The optical loss-wavelength characteristic is flattened not only at a pass band 27 of the optical signal $\lambda_5$ at the central position, but also in all of the wavelength ranges including pass bands 26 and 28 of the optical signals $\lambda_1$ and $\lambda_9$.

As a result, the optical insertion loss characteristic can be stabilized, therefore it is possible to eliminate the disadvantage of the conventional optical wavelength multiplexer/demultiplexer, that is the optical loss characteristic is significantly fluctuated by the slight fluctuation of the wavelength.

In the first preferred embodiment, the correction angles $\Delta\theta_1$ and $\Delta\theta_2$, and $\Delta\theta_1$ and $\Delta\theta_2$ of the channel waveguides 5 at both of the input and output sides are determined as 0.02 (deg). However, the degrees of the respective correction angles may be different from each other.

For example, the same effect can be achieved by providing the correction angles $\Delta\theta_1=0.020$ (deg), $\Delta\theta_2=0.015$ (deg), $\Delta\phi_1=0.010$ (deg), and $\Delta\phi_2=0.005$ (deg). In the first preferred embodiment, the number of the positions where the correction angles are provided is explained as two, however, the positions for the correction angles may be more than two.

One of a glass substrate, a semiconductor substrate, etc. is used as a substrate 1 according to the invention. Optically transparent material such as glass material or semiconductor material can be used as a core, a clad layer, and a buffer layer.

As described above, according to the invention, it is possible to provide an optical wavelength multiplexer/demultiplexer, in which a plurality of channel waveguides are arranged such that all intervals thereof are not constant between each two adjacent channel waveguides at coupling portions for an input and output slab waveguides and an arrayed waveguide diffraction grating. By this structure, since the stigmatism of the waveguides can be canceled, the pass bands for all wavelength ranges are flattened and the optical insertion loss characteristics are not fluctuated. The effect thereof is very high for increasing the practical utility of an arrayed waveguide diffraction grating type optical wavelength multiplexer/demultiplexer.

Next, an optical wavelength multiplexer/demultiplexer in another preferred embodiment according to the invention will be explained.

Figure 11A:
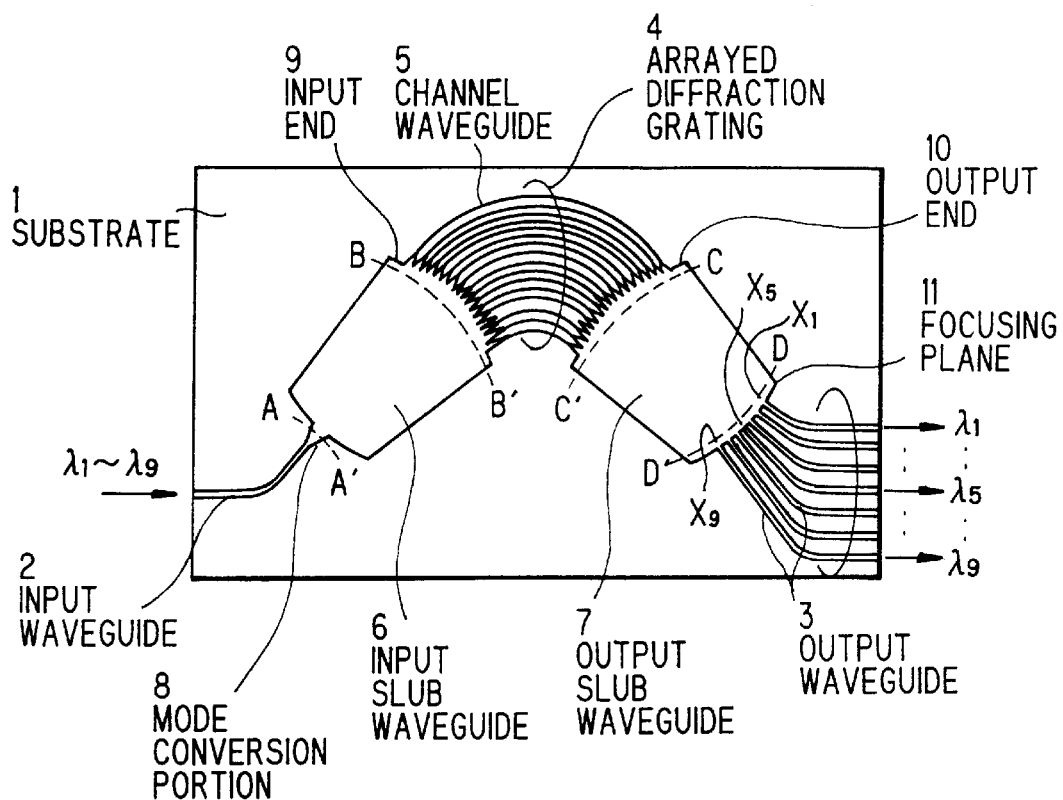
FIG. 11A is a plan view thereof and FIG. 11B is a partial enlarged view thereof.
Figure 11B:
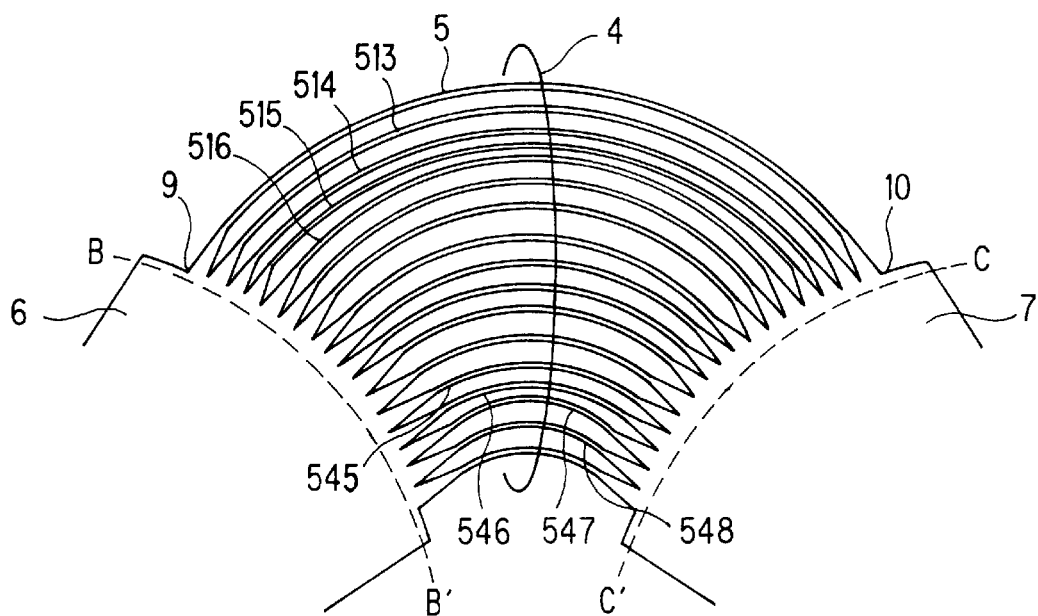

FIG. 11A and 11B show an optical wavelength multiplexer/demultiplexer in the second preferred embodiment according to the invention, wherein the optical wavelength multiplexer/demultiplexer comprises a substrate 1, an input waveguide 2 formed on one side of the substrate 1, output waveguides 3 formed on another side of the substrate 1, and an arrayed waveguide diffraction grating 4 formed on a central portion of the substrate 1, wherein the arrayed waveguide diffraction grating 1 is composed of a plurality of channel waveguides 5 in parallel each having a predetermined path length difference.

The optical wavelength multiplexer/demultiplexer further comprises an input slab waveguide 6 four coupling the input waveguide 2 and the arrayed waveguide diffraction grating 4, an output slab waveguide 7 for coupling the output waveguide 3 and the arrayed waveguide diffraction grating 4, and a mode conversion portion 8 provided between the input waveguide 2 and the input slub waveguide 6, wherein an input end 9 of the arrayed diffraction grating 4 transmits optical signals to the arrayed waveguide diffraction grating 4, and an output end 10 of the arrayed waveguide diffraction grating 4 focuses the optical signals on a focusing plane 11 formed at an end portion of the output slab waveguide 7.

In the optical wavelength multiplexer/demultiplexer, multiplexed optical signals each having wavelengths $\lambda_1$ to $\lambda_9$ are input from the input waveguide 2 and transmitted through the input slub waveguide 6, the arrayed waveguide diffraction grating 4 and the output slab waveguide 7. The multiplexed optical signals $\lambda_1$ to $\lambda_9$ are demultiplexed therethrough and finally output from the output waveguides 3 as demultiplexed optical signals $\lambda_1, \lambda_2 - - - \lambda_9$, respectively.

As shown in FIG. 11B, in the second preferred embodiment, length differences between two adjacent channel waveguides 514–515, 515–516, 545–546, and 546–547 are determined to be smaller than those of other two adjacent channel waveguides 513–514, 547–548, etc.

Namely, disposition pitches of the channel waveguides 5 and the length differences between each two adjacent channel waveguides are determined to be constant for all two adjacent channel waveguides except between the two adjacent channel waveguides 514–515, 515–516, 545–546, and 546–547. Accordingly, the length differences between the two adjacent channel waveguides 514–515, 515–516, 545–546, and 546–547 are determined to be half (0.5) of those of other two adjacent channel waveguides 513–514, 547–548, etc. in which the length differences are constant.

The above explained length differences between the two adjacent channel waveguides are determined in accordance with the standard II of the following standards I to IV, however, the lengths may be corrected in accordance with the other standards.

[Standard I]

When the total number of the channel waveguides is N, the number in numerical order of one of the channel waveguides is i, predetermined numbers of the channel waveguides are $i_1$ and $i_2$, a reference length of the channel waveguides is $L_0$, a common length difference between each two adjacent channel waveguides is $\Delta L$, and first and second correction values of lengths of the channel waveguides are $dL_1$, $dL_2$, a length $L_i$ of the i-th channel waveguide is determined in accordance with following formula:

$$L_i = L_0 + \Delta L \times (i-1) \qquad (1 \leq i < i_1)$$
$$= L_0 + \Delta L \times (i-1) + dL_1 \quad (i_1 \leq i < i_2)$$
$$= L_0 + \Delta L \times (i-1) + dL_2 \quad (i_2 \leq i \leq N)$$

[Standard II]

When the total number of the channel waveguides is N, the number in numerical order of one of the channel waveguide is i, predetermined numbers of the channel waveguides are $i_1$ and $i_2$, a reference length of the channel waveguides is $L_0$, and a common length difference between each two adjacent channel waveguides is $\Delta L$, the length $L_i$ of the i-th channel waveguide is determined in accordance with following formula:

$$L_i = L_0 + \Delta L \times (i-1) \qquad (1 \leq i < i_1)$$
$$= L_0 + \Delta L \times (i-1) - \Delta L/2 \quad (i = i_1)$$
$$= L_0 + \Delta L \times (i-1) - \Delta L \quad (i_1 + 1 \leq i < i_2)$$
$$= L_0 + \Delta L \times (i-1) - 1.5 \cdot \Delta L \quad (i = i_2)$$
$$= L_0 + \Delta L \times (i-1) - 2 \cdot \Delta L \quad (i_2 + 1 \leq i \leq N)$$

[Standard III]

When the total number of the channel waveguides is N, the number in numerical order of one of the channel waveguide is i, predetermined numbers of the channel waveguides are $i_1$ and $i_2$, a reference length of the channel waveguides is $L_0$, and a common length difference between each two adjacent channel waveguides is $\Delta L$, the length $L_i$ of the i-th channel waveguide is determined in accordance with following formula:

$$L_i = L_0 + \Delta L \times (i-1) \qquad (1 \leq i < i_1)$$
$$= L_0 + \Delta L \times (i-1) + \Delta L/2 \qquad (i = i_1)$$
$$= L_0 + \Delta L \times (i-1) + \Delta L \qquad (i_1 + 1 \leq i < i_2)$$
$$= L_0 + \Delta L \times (i-1) + 1.5 \cdot \Delta L \qquad (i = i_2)$$
$$= L_0 + \Delta L \times (i-1) + 2 \cdot \Delta L \qquad (i_2 + 1 \leq i \leq N)$$

[Standard IV]

When the total number of the channel waveguides is N, the number in numerical order of one of the channel waveguide is i, predetermined numbers of the channel waveguides are $i_1$ and $i_2$, a reference length of the channel waveguides is $L_0$, first, second and third correction values of lengths of the channel waveguides are $\Delta L_1$, $\Delta L_2$, and $\Delta L_3$, a propagation constant of a predetermined wavelengths $\lambda_j$ is $\beta(\lambda_j)$, the first, second, and third correction values $\Delta L_1$, $\lambda L_2$, and $\lambda L_3$ are respectively, $\Delta L_1 = 2 \cdot m_1 \cdot \pi / \beta(\lambda_j)$ ($m_1$ is a positive integer), $\Delta L_2 = 2 \cdot m_2 \cdot \pi / \beta(\lambda_j)$ ($m_2$ is a positive integer), and $\Delta L_3 = 2 \cdot m_3 \cdot \pi / \beta(\lambda_j)$ ($m_3$ is a positive integer), the length $L_i$ of the i-th channel waveguide is determined in accordance with following formula:

$$L_i = L_0 + \Delta L_1 \times (i-1) \qquad (i \leq i < i_1)$$
$$= L_0 + \Delta L_2 \times (i-1) \qquad (i_1 \leq i < i_2)$$
$$= L_0 + \Delta L_3 \times (i-1) \qquad (i_2 \leq i \leq N)$$

When the total number of the channel waveguides 5 is N, and the predetermined numbers $i_1$ and $i_2$ in numerical order of the channel waveguides 5 are defined as follows:

$i_1 = dN_1$ $i_2 = N - dN_2$ \hfill (6)

Herein, it is preferable that $dN_1$ and $dN_2$ are provided within a range of ⅙ to ⅓ of the total number N of the channel waveguides.

It is not preferable that the $dN_1$ and $dN_2$ are provided beyond this range, since the stigmatism canceling effect cannot be obtained sufficiently at the lower limit thereof and this effect becomes excessive at the upper limit thereof.

In the second preferred embodiment, the common length difference $\Delta L$ between each two adjacent channel waveguides 513–514, 547–548, etc., which are arranged in a curved disposition, is obtained in accordance with the formula (1).

In the structure shown in FIGS. 11A and 11B, the total number of the channel waveguides 5 is 60.

In the above structure of the second preferred embodiment, electric field distributions (intensities) shown in FIGS. 7A to 7C, phase distributions and phase differences shown in FIGS. 8A to 8E, electric field distributions (optical intensities) shown in FIG. 9, and insertion loss characteristics shown in FIG. 10 are obtained in the same manner. As a result, it is confirmed that the measured values thereof are almost equal to those in the first preferred embodiment.

As described above, according to the invention, it is possible to provide an optical wavelength multiplexer/demultiplexer, in which a plurality of channel waveguides are arranged such that all length differences thereof are not constant between each two adjacent channel waveguides in an arrayed waveguide diffraction grating. By this structure, since the stigmatism of the waveguides can be canceled, the pass bands for all wavelength ranges are flattened and the optical insertion loss characteristics are not fluctuated. The effect thereof is very high for increasing the practical utility of an arrayed waveguide diffraction grating type optical wavelength multiplexer/demultiplexer. In the first and second preferred embodiments, an optical wavelength demultiplexer is explained. However, when this is used for an optical wavelength multiplexer, optical signals are supplied to output waveguides 3, and a multiplexed signal is obtained at an input waveguide 2.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical wavelength multiplexer/demultiplexer, comprising:

an input waveguide formed on a substrate, output waveguides formed on said substrate, an arrayed waveguide diffraction grating comprising a plurality of channel waveguides in parallel formed to have predetermined length differences between two adjacent channel waveguides on said substrate, an input slab waveguide for coupling said input waveguide to said arrayed waveguide diffraction gating to provide a first coupling portion; and an output slab waveguide for coupling said arrayed waveguide diffraction grating to said output waveguide to provide a second coupling portion;

wherein:

said plurality of channel waveguides of said arrayed waveguide diffraction grating are arranged such that all intervals thereof are not constant between each two adjacent channel waveguides at said second coupling portion, said plurality of channel waveguides are arranged such that plural ends of said second coupling portion formed between said plurality of channel waveguides and said output slab waveguide are disposed on an arched line having a predetermined curvature, and that all of angles formed by a reference point and each two of said plural ends of said second coup ling portion are not constant on said substrate, and said plurality of channel waveguides are arranged such that, when the total number thereof is N, the number of one of said plurality of channel waveguides in numerical order is i, numbers in numerical order of first and second predetermined channel waveguides are $i_1$ and $i_2$, respectively, an angle formed by one of said plurality of channel waveguides having the number i=1 to a predetermined reference line is $\theta_0$, a common angle for two adjacent channel waveguides is $\Delta\theta$, and first and second correction angles for correcting said common angle $\Delta\theta$ are $\Delta\theta_1$ and $\Delta\theta_2$, respectively, an angle $\theta_i$ formed by the i-th channel waveguide to said reference line is determined in accordance with following formula:

$$\theta_i = \theta_0 + \Delta\theta \times (i-1) \qquad (1 \leq i < i_1)$$
$$= \theta_0 + \Delta\theta \times (i-1) + \Delta\theta_1 \qquad (i_1 \leq i < i_2)$$
$$= \theta_0 + \Delta\theta \times (i-1) + \Delta\theta_1 + \Delta\theta_2 \qquad (i_2 \leq i \leq N).$$

2. An optical wavelength multiplexer/demultiplexer, according to claim 1, wherein:

said first correction angle $\Delta\theta_1$ is provided within a ranged determined by:

$$-0.5 \times \Delta\theta \leq \Delta\theta_1 \leq 0.5 \times \Delta\theta, \text{ and}$$

said second correction angle $\Delta\theta_2$ is provided within a range determined by:

$$-0.5 \times \Delta\theta \leq \Delta\theta_2 \leq 0.5 \times \Delta\theta.$$

3. An optical wavelength multiplexer/demultiplexer, according to claim 1, wherein:

when said numbers $i_1$ and $i_2$ of first and second predetermined channel waveguides are defined as:

$$i_1 = dN_1$$

$$i_2 = N - dN_2$$

said $dN_1$ and $dN_2$ are provided in a range of 1/6 to 1/3 of said total number N of said plurality of channel waveguides.

4. An optical wavelength multiplexer/demultiplexer, comprising:

an input waveguide formed on a substrate;

output waveguides formed on said substrate;

an arrayed waveguide diffraction grating comprising a plurality of channel waveguides in parallel formed to have predetermined length differences between two adjacent channel waveguides on said substrate;

an input slab waveguide for coupling said input waveguide to said arrayed waveguide diffraction grating to provide a first coupling portion; and an output slab waveguide for coupling said arrayed waveguide diffraction grating to said output waveguide to provide a second coupling portion;

wherein:

said plurality of channel waveguides of said arrayed waveguide diffraction grating are arranged such that all intervals thereof are not constant between each two adjacent channel waveguides at both said first and second coupling portions, said plurality of channel waveguides are arranged such that plural ends of said first coupling portion formed between said plurality of channel waveguides and said input slab waveguide are disposed on an arched line having a predetermined curvature, and that all angles formed by a reference point and each two of said plural ends of said first coupling portion are not constant on said substrate, and said plurality of channel waveguides are arranged such that, when the total number thereof is N, the number of one of said plurality of channel waveguides in numerical order is i, numbers in numerical order of third and fourth predetermined channel waveguides are $i_3$ and $i_4$, respectively, an angle formed by one of said plurality of channel waveguides having the number i=1 to a predetermined reference line at said input slab waveguide side is $\phi_0$, a common angle for two adjacent channel waveguides at first coupling portion is $\Delta\phi$, and first and second correction angles for correcting said common angle, $\Delta\phi$ are $\Delta\phi_1$ and $\Delta\phi_2$ respectively, an angle $\phi_i$ formed by the i-th channel waveguide to said reference line at said input slab waveguide side is determined in accordance with the following formula:

$$\phi_i = \phi_0 + \Delta\phi \times (i-1) \qquad (1 \leq i < i_3)$$
$$= \phi_0 + \Delta\phi \times (i-1) + \Delta\phi_1 \qquad (i_3 \leq i < i_4)$$
$$= \phi_0 + \Delta\phi \times (i-1) + \Delta\phi_1 + \Delta\phi_2 \qquad (i_4 \leq i \leq N).$$

5. An optical wavelength multiplexer/demultiplexer, according to claim 4, wherein:

said first correction angle $\lambda\phi_1$ is provided within a ranged determined by:

$$-0.5 \times \Delta\theta \leq \Delta\theta_1 \leq 0.5 \times \Delta\phi, \text{ and}$$

said second correction angle $\Delta\phi_2$ is provided within a range determined by:

$$-0.5 \times \Delta\theta \leq \Delta\theta_2 \leq 0.5 \times \Delta\phi.$$

6. An optical wavelength multiplexer/demultiplexer, according to claim 4, wherein:

when said numbers $i_3$ and $i_4$ of third and fourth predetermined channel waveguides are defined as:

$$i_3 = dN_3$$

$$i_4 = dN_4$$

said $dN_3$ and $dN_4$ are provided in a range of 1/6 to 1/3 of said total number N of said plurality of channel waveguides.

7. An optical wavelength multiplexer/demultiplexer, comprising:

an input waveguide formed on a substrate;

output waveguides formed on said substrate;

an arrayed waveguide diffraction grating comprising a plurality of channel waveguides in parallel formed to have predetermined length differences between two adjacent channel waveguides on said substrate;

an input slab waveguide for coupling said input waveguide to said arrayed waveguide diffraction grating to provide a first coupling portion; and an output slab waveguide for coupling said arrayed waveguide diffraction grating to said output waveguide to provide a second coupling portion;

wherein:

said plurality of channel waveguides of said arrayed waveguide diffraction grating are arranged such that all length differences thereof are not constant between each two adjacent channel waveguides, and when the total number of said plurality of channel waveguides is N, a number in numerical order of one of said plurality of channel waveguides is i, predetermined numbers of first and second channel waveguides are $i_1$ and $i_2$, a reference length of said channel waveguides is $L_0$, a common length difference between two adjacent channel waveguides is $\Delta L$, and first and second correction values of lengths of said plurality of channel waveguides are $dL_1$ and $dL_2$, respectively, a length of the i-th channel waveguide $L_i$ is determined in accordance with the following formula:

$$L_i = L_0 + \Delta L \times (i-1) \qquad (1 \leq i < i_1)$$
$$= L_0 + \Delta L \times (i-1) + dL_1 \quad (i_1 \leq i < i_2)$$
$$= L_0 + \Delta L \times (i-1) + dL_2 \quad (i_2 \leq i \leq N).$$

8. An optical wavelength multiplexer/demultiplexer, comprising:
    an input waveguide formed on a substrate;
    output waveguides formed on said substrate;
    an arrayed waveguide diffraction grating comprising a plurality of channel waveguides in parallel formed to have predetermined length differences between two adjacent channel waveguides on said substrate;
    an input slab waveguide for coupling said input waveguide to said arrayed waveguide diffraction grating to provide a first coupling portion; and
    an output slab waveguide for coupling said arrayed waveguide diffraction grating to said output waveguide to provide a second coupling portion;
    wherein:
        said plurality of channel waveguides of said arrayed waveguide diffraction orating are arranged such that all length differences thereof are not constant between each two adjacent channel waveguides, and
        when the total number of the plurality of channel waveguides is N, a number in numerical order of one of said plurality channel waveguides is 1, predetermined numbers of first and second channel waveguides are $i_1$ and $i_2$, a reference length of said channel waveguides is $L_0$, and a common length difference between two adjacent channel waveguides is $\Delta L$, the length of the i-th channel waveguide $L_i$ is determined in accordance with the following formula:

$$L_i = L_0 + \Delta L \times (i-1) \qquad (1 \leq i < i_1)$$
$$= L_0 + \Delta L \times (i-1) - \Delta L/2 \quad (i = i_1)$$
$$= L_0 + \Delta L \times (i-1) - \Delta L \qquad (i_1 + 1 \leq i < i_2)$$
$$= L_0 + \Delta L \times (i-1) - 1.5 \cdot \Delta L \quad (i = i_2)$$
$$= L_0 + \Delta L \times (i-1) - 2 \cdot \Delta L \quad (i_2 + 1 \leq i \leq N).$$

9. An optical wavelength multiplexer/demultiplexer, comprising:
    an input waveguide formed on a substrate;
    output waveguides formed on said substrate;
    an arrayed waveguide diffraction grating comprising a plurality of channel waveguides in parallel formed to have predetermined length differences between two adjacent channel waveguides on said substrate;
    an input slab waveguide for coupling said input waveguide to said arrayed waveguide diffraction grating to provide a first coupling portion; and
    an output slab waveguide for coupling said arrayed waveguide diffraction grating to said output waveguide to provide a second coupling portion;
    wherein:
        said plurality of channel waveguides of said arrayed waveguide diffraction grating are arranged such that all length differences thereof are not constant between each two adjacent channel waveguides, and
        when the total number of said plurality of channel waveguides is N, a number in numerical order of one of said plurality of channel waveguides is 1, predetermined numbers of first and second channel waveguides are $i_1$ and $i_2$, respectively, a reference length of said plurality of channel waveguides is $L_0$, and a common length difference between two adjacent channel waveguides is $\Delta L$, the length of the i-th channel waveguide $L_i$ is determined in accordance with the following formula:

$$L_i = L_0 + \Delta L \times (i-1) \qquad (1 \leq i < i_1)$$
$$= L_0 + \Delta L \times (i-1) + \Delta L/2 \quad (i = i_1)$$
$$= L_0 + \Delta L \times (i-1) + \Delta L \qquad (i_1 + 1 \leq i < i_2)$$
$$= L_0 + \Delta L \times (i-1) + 1.5 \cdot \Delta L \quad (i = i_2)$$
$$= L_0 + \Delta L \times (i-1) + 2 \cdot \Delta L \quad (i_2 + 1 \leq i \leq N).$$

10. An optical wavelength multiplexer/demultiplexer, comprising:
    an input waveguide formed on a substrate;
    output waveguides formed on said substrate;
    an arrayed waveguide diffraction grating comprising a plurality of channel waveguides in parallel formed to have predetermined length differences between two adjacent channel waveguides on said substrate;
    an input slab waveguide for coupling said input waveguide to said arrayed waveguide diffraction grating to provide a first coupling portion; and
    an output slab waveguide for coupling said arrayed waveguide diffraction grating to said output waveguide to provide a second coupling portion;
    wherein:
        said plurality of channel waveguides of said arrayed waveguide diffraction grating are arranged such that all length differences thereof are not constant between each two adjacent channel waveguides, and
        when the total number of said plurality of channel waveguides is N, a number in numerical order of one of said plurality of channel waveguides is i, predetermined numbers of first and second channel waveguides are $i_1$ and $i_2$, a reference length of said plurality of channel waveguides is $L_0$, first, second and third correction values of lengths of said channel waveguides are $\Delta L_1$, $\Delta L_2$, and $\Delta L_3$, respectively, a propagation constant of a predetermined wavelength $\lambda_j$ is $\beta(\lambda_j)$, said first, second and third correction values $\Delta L_1$, $\Delta L_2$, and $\Delta L_3$ are respectively defined as, $\Delta L_1 = 2 \cdot m_1 \cdot \pi / \beta(\lambda_j)$ ($m_1$ is a positive integer), $\Delta L_2 = 2 \cdot m_2 \cdot \pi / \beta(\lambda_j)$ ($m_2$ is a positive integer), and $\Delta L_3 = 2 \cdot m_3 \cdot \pi / \beta(\lambda_j)$ ($m_3$ is a positive integer), where $m_1 \neq m_2$, and $m_3 \neq m_2$ the length of the i-th channel waveguide $L_i$ is determined in accordance with the following formula:

$$L_i = L_0 + \Delta L_1 \times (i-1) \quad (1 \leq i < i_1)$$
$$\phantom{L_i} = L_0 + \Delta L_2 \times (i-1) \quad (i_1 \leq i < i_2)$$
$$\phantom{L_i} = L_0 + \Delta L_3 \times (i-1) \quad (i_2 \leq i \leq N).$$

11. An optical waveguide multiplexer/demultiplexer, according to claim 7, wherein:

when the total number of said plurality of channel waveguides is N, and numbers $i_1$ and $i_2$ in numerical order of said first and second channel waveguides are defined as follows:

$$i_1 = dN_1, \text{ and}$$

$$i_2 = N - dN_2,$$

said $dN_1$ and $dN_2$ are provided within a range of ⅙ to ⅓ of the total number N of said plurality of channel waveguides.

* * * * *